United States Patent
Kimball et al.

(10) Patent No.: US 11,645,388 B1
(45) Date of Patent: ***May 9, 2023

(54) SYSTEMS AND METHODS FOR DETECTING NON-MALICIOUS FAULTS WHEN PROCESSING SOURCE CODES

(71) Applicant: ARCHITECTURE TECHNOLOGY CORPORATION, Eden Prairie, MN (US)

(72) Inventors: Colleen Kimball, Ithaca, NY (US); Robert A. Joyce, Ithaca, NY (US); Judson Powers, Ithaca, NY (US); Matthew Donovan, Ithaca, NY (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 240 days.

This patent is subject to a terminal disclaimer.

(21) Appl. No.: 17/080,359

(22) Filed: Oct. 26, 2020

Related U.S. Application Data

(63) Continuation of application No. 16/012,695, filed on Jun. 19, 2018, now Pat. No. 10,817,604.

(51) Int. Cl.
*G06F 21/56* (2013.01)
*G06F 8/73* (2018.01)
(Continued)

(52) U.S. Cl.
CPC .............. *G06F 21/563* (2013.01); *G06F 8/73* (2013.01); *G06F 21/577* (2013.01); *G06N 20/00* (2019.01); *G06F 2221/033* (2013.01)

(58) Field of Classification Search
CPC ........ G06F 21/563; G06F 8/73; G06F 21/577; G06F 2221/033; G06N 20/00
(Continued)

(56) References Cited

U.S. PATENT DOCUMENTS

| 4,895,518 A | 1/1990 | Arnold et al. |
| 5,115,433 A | 5/1992 | Baran et al. |

(Continued)

FOREIGN PATENT DOCUMENTS

| CN | 106709613 A | 5/2017 |
| WO | WO-02/071192 A2 | 9/2002 |
| WO | WO-2017/105383 A1 | 6/2017 |

OTHER PUBLICATIONS

"Cybersecurity," U.S. Department of Defense Instruction, No. 8500_01, accessible via.https://www.esd_whs.mil/ Portals/54/Documents/D D/issuances/dodi/850001 _ 2014 _ pdf, Mar. 14, 2014, 58 pages.

(Continued)

*Primary Examiner* — Kambiz Zand
*Assistant Examiner* — Aubrey H Wyszynski
(74) *Attorney, Agent, or Firm* — Foley & Lardner LLP

(57) ABSTRACT

Disclosed herein are embodiments of systems, methods, and products that execute tools to identify non-malicious faults in source codes introduced by engineers and programmers. The tools may execute a machine learning model on the source codes to perform sentiment analysis and pattern analysis on information associated with the source codes to generate annotated source code files identifying anomalies based on the sentiment analysis and the pattern analysis. One or more threat levels are then identified and ranked based on the one or more anomalies and a ranked list of the one or more threat levels is displayed on a graphical user interface of a computer.

20 Claims, 3 Drawing Sheets

(51) Int. Cl.
*G06N 20/00* (2019.01)
*G06F 21/57* (2013.01)

(58) Field of Classification Search
USPC .......................................................... 726/23
See application file for complete search history.

(56) References Cited

U.S. PATENT DOCUMENTS

| | | | |
|---|---|---|---|
| 5,440,723 | A | 8/1995 | Arnold et al. |
| 5,601,432 | A | 2/1997 | Bergman |
| 5,944,783 | A | 8/1999 | Nieten |
| 5,974,549 | A | 10/1999 | Golan |
| 6,088,804 | A | 7/2000 | Hill et al. |
| 6,345,283 | B1 | 2/2002 | Anderson |
| 6,658,481 | B1 | 12/2003 | Basso et al. |
| 6,985,476 | B1 | 1/2006 | Elliott et al. |
| 7,058,968 | B2 | 6/2006 | Rowland et al. |
| 7,107,347 | B1 | 9/2006 | Cohen |
| 7,228,566 | B2 | 6/2007 | Caceres et al. |
| 7,234,168 | B2 | 6/2007 | Gupta et al. |
| 7,257,630 | B2 | 8/2007 | Cole et al. |
| 7,317,733 | B1 | 1/2008 | Olsson et al. |
| 7,325,252 | B2 | 1/2008 | Bunker et al. |
| 7,372,809 | B2 | 5/2008 | Chen et al. |
| 7,496,959 | B2 | 2/2009 | Adelstein et al. |
| 7,522,908 | B2 | 4/2009 | Hrastar |
| 7,694,328 | B2 | 4/2010 | Joshi et al. |
| 7,743,074 | B1 | 6/2010 | Parupudi et al. |
| 7,748,040 | B2 | 6/2010 | Adelstein et al. |
| 7,818,804 | B2 | 10/2010 | Marceau |
| 7,886,049 | B2 | 2/2011 | Adelstein et al. |
| 7,925,984 | B2 | 4/2011 | Awe et al. |
| 7,930,353 | B2 | 4/2011 | Chickering et al. |
| 7,962,961 | B1 | 6/2011 | Griffin et al. |
| 8,079,080 | B2 | 12/2011 | Borders |
| 8,156,483 | B2 | 4/2012 | Berg et al. |
| 8,176,557 | B2 | 5/2012 | Adelstein et al. |
| 8,250,654 | B1 | 8/2012 | Kennedy et al. |
| 8,266,320 | B1 | 9/2012 | Bell et al. |
| 8,296,848 | B1 | 10/2012 | Griffin et al. |
| 8,307,444 | B1 | 11/2012 | Mayer et al. |
| 8,321,437 | B2 | 11/2012 | Lim |
| 8,341,732 | B2 | 12/2012 | Croft et al. |
| 8,407,801 | B2 | 3/2013 | Ikegami et al. |
| 8,433,768 | B1 | 4/2013 | Bush et al. |
| 8,458,805 | B2 | 6/2013 | Adelstein et al. |
| 8,490,193 | B2 | 7/2013 | Sarraute Yamada et al. |
| 8,495,229 | B2 | 7/2013 | Kim |
| 8,499,354 | B1 | 7/2013 | Satish et al. |
| 8,554,536 | B2 | 10/2013 | Adelman et al. |
| 8,862,803 | B2 | 10/2014 | Powers et al. |
| 8,893,278 | B1 | 11/2014 | Chechik |
| 9,076,342 | B2 | 7/2015 | Brueckner et al. |
| 9,081,911 | B2 | 7/2015 | Powers et al. |
| 9,083,741 | B2 | 7/2015 | Powers |
| 9,137,325 | B2 | 9/2015 | Muhunthan et al. |
| 9,208,323 | B1 | 12/2015 | Karta et al. |
| 9,225,637 | B2 | 12/2015 | Ramanujan et al. |
| 9,325,728 | B1 | 4/2016 | Kennedy et al. |
| 9,384,677 | B2 | 7/2016 | Brueckner et al. |
| 9,626,414 | B2 * | 4/2017 | Kanjirathinkal .. G06F 16/24578 |
| 9,882,912 | B2 | 1/2018 | Joo |
| 10,079,850 | B1 | 9/2018 | Patil et al. |
| 10,083,624 | B2 | 9/2018 | Brueckner et al. |
| 10,291,634 | B2 | 5/2019 | Arzi et al. |
| 10,291,638 | B1 | 5/2019 | Chandana et al. |
| 10,540,502 | B1 | 1/2020 | Joyce et al. |
| 10,558,809 | B1 | 2/2020 | Joyce et al. |
| 10,686,811 | B1 | 6/2020 | Ehle |
| 10,749,890 | B1 | 8/2020 | Aloisio et al. |
| 10,803,766 | B1 | 10/2020 | Donovan et al. |
| 10,817,604 | B1 * | 10/2020 | Kimball .................. G06F 8/73 |
| 10,868,825 | B1 | 12/2020 | Dominessy et al. |
| 10,949,338 | B1 | 3/2021 | Sirianni et al. |
| 11,128,654 | B1 | 9/2021 | Joyce et al. |

| | | | |
|---|---|---|---|
| 2002/0073204 | A1 | 6/2002 | Dutta et al. |
| 2002/0078382 | A1 | 6/2002 | Sheikh et al. |
| 2002/0129264 | A1 | 9/2002 | Rowland et al. |
| 2002/0162017 | A1 | 10/2002 | Sorkin et al. |
| 2003/0056116 | A1 | 3/2003 | Bunker et al. |
| 2003/0182582 | A1 | 9/2003 | Park et al. |
| 2003/0236993 | A1 | 12/2003 | McCreight et al. |
| 2004/0039921 | A1 | 2/2004 | Chuang |
| 2005/0132225 | A1 | 6/2005 | Gearhart |
| 2005/0138413 | A1 | 6/2005 | Lippmann et al. |
| 2005/0165834 | A1 | 7/2005 | Nadeau et al. |
| 2005/0193173 | A1 | 9/2005 | Ring et al. |
| 2005/0193430 | A1 | 9/2005 | Cohen et al. |
| 2005/0203921 | A1 | 9/2005 | Newman et al. |
| 2006/0037076 | A1 | 2/2006 | Roy |
| 2006/0104288 | A1 | 5/2006 | Yim et al. |
| 2006/0109793 | A1 | 5/2006 | Kim et al. |
| 2006/0167855 | A1 | 7/2006 | Ishikawa et al. |
| 2006/0191010 | A1 | 8/2006 | Benjamin |
| 2006/0248525 | A1 | 11/2006 | Hopkins |
| 2006/0253906 | A1 | 11/2006 | Rubin et al. |
| 2006/0271345 | A1 | 11/2006 | Kasuya |
| 2007/0055766 | A1 | 3/2007 | Petropoulakis et al. |
| 2007/0112714 | A1 | 5/2007 | Fairweather |
| 2007/0192863 | A1 | 8/2007 | Kapoor et al. |
| 2008/0010225 | A1 | 1/2008 | Gonsalves et al. |
| 2008/0167920 | A1 | 7/2008 | Schmidt et al. |
| 2008/0183520 | A1 | 7/2008 | Cutts et al. |
| 2008/0222734 | A1 | 9/2008 | Redlich et al. |
| 2009/0007270 | A1 | 1/2009 | Futoransky et al. |
| 2009/0144827 | A1 | 6/2009 | Peinado et al. |
| 2009/0150998 | A1 | 6/2009 | Adelstein et al. |
| 2009/0158430 | A1 | 6/2009 | Borders |
| 2009/0164522 | A1 | 6/2009 | Fahey |
| 2009/0208910 | A1 | 8/2009 | Brueckner et al. |
| 2009/0254572 | A1 | 10/2009 | Redlich et al. |
| 2009/0288164 | A1 | 11/2009 | Adelstein et al. |
| 2009/0319247 | A1 | 12/2009 | Ratcliffe et al. |
| 2009/0319249 | A1 | 12/2009 | White et al. |
| 2009/0319647 | A1 | 12/2009 | White et al. |
| 2009/0319906 | A1 | 12/2009 | White et al. |
| 2009/0320137 | A1 | 12/2009 | White et al. |
| 2009/0328033 | A1 | 12/2009 | Kohavi et al. |
| 2010/0010968 | A1 | 1/2010 | Redlich et al. |
| 2010/0058114 | A1 | 3/2010 | Perkins et al. |
| 2010/0082513 | A1 | 4/2010 | Liu |
| 2010/0146615 | A1 | 6/2010 | Locasto et al. |
| 2010/0284282 | A1 | 11/2010 | Golic |
| 2010/0319069 | A1 | 12/2010 | Granstedt et al. |
| 2011/0154471 | A1 | 6/2011 | Anderson et al. |
| 2011/0177480 | A1 | 7/2011 | Menon et al. |
| 2011/0282715 | A1 | 11/2011 | Nguyen et al. |
| 2012/0198513 | A1 | 8/2012 | Maida-Smith et al. |
| 2012/0210017 | A1 | 8/2012 | Muhunthan et al. |
| 2012/0210427 | A1 | 8/2012 | Bronner et al. |
| 2013/0014264 | A1 | 1/2013 | Kennedy et al. |
| 2013/0019312 | A1 | 1/2013 | Bell et al. |
| 2013/0055404 | A1 | 2/2013 | Khalili |
| 2013/0347085 | A1 | 12/2013 | Hawthorn et al. |
| 2013/0347116 | A1 | 12/2013 | Flores et al. |
| 2014/0046645 | A1 | 2/2014 | White et al. |
| 2014/0099622 | A1 | 4/2014 | Arnold et al. |
| 2014/0165138 | A1 | 6/2014 | Maida-Smith et al. |
| 2014/0287383 | A1 | 9/2014 | Willingham et al. |
| 2014/0321735 | A1 | 10/2014 | Zhang et al. |
| 2014/0337971 | A1 | 11/2014 | Casassa Mont et al. |
| 2015/0050623 | A1 | 2/2015 | Falash et al. |
| 2015/0106324 | A1 | 4/2015 | Puri et al. |
| 2015/0163088 | A1 * | 6/2015 | Anschutz ............ G06F 11/3003 709/224 |
| 2015/0193695 | A1 | 7/2015 | Cruz Mota et al. |
| 2015/0213260 | A1 | 7/2015 | Park |
| 2015/0213730 | A1 | 7/2015 | Brueckner et al. |
| 2015/0339477 | A1 | 11/2015 | Abrams et al. |
| 2016/0028764 | A1 | 1/2016 | Vasseur et al. |
| 2016/0099953 | A1 | 4/2016 | Hebert et al. |
| 2016/0173495 | A1 | 6/2016 | Joo |
| 2016/0188814 | A1 | 6/2016 | Raghavan et al. |
| 2016/0219024 | A1 | 7/2016 | Verzun et al. |

(56) References Cited

U.S. PATENT DOCUMENTS

| | | | |
|---|---|---|---|
| 2016/0234242 | A1 | 8/2016 | Knapp et al. |
| 2016/0246662 | A1 | 8/2016 | Meng et al. |
| 2016/0307199 | A1 | 10/2016 | Patel et al. |
| 2016/0337400 | A1 | 11/2016 | Gupta |
| 2017/0032694 | A1 | 2/2017 | Brueckner et al. |
| 2017/0032695 | A1 | 2/2017 | Brueckner et al. |
| 2017/0104778 | A1 | 4/2017 | Shabtai et al. |
| 2017/0171230 | A1 | 6/2017 | Leiderfarb et al. |
| 2018/0048534 | A1 | 2/2018 | Banga et al. |
| 2018/0121657 | A1 | 5/2018 | Hay et al. |
| 2018/0129805 | A1 | 5/2018 | Samuel |
| 2018/0150554 | A1* | 5/2018 | Le ................. G06F 16/215 |
| 2018/0159894 | A1 | 6/2018 | Reddy et al. |
| 2018/0191763 | A1* | 7/2018 | Hillard ............. H04L 63/1416 |
| 2018/0191770 | A1 | 7/2018 | Nachenberg et al. |
| 2018/0219887 | A1 | 8/2018 | Luo et al. |
| 2018/0225471 | A1 | 8/2018 | Goyal et al. |
| 2018/0295154 | A1 | 10/2018 | Crabtree et al. |
| 2018/0330253 | A1* | 11/2018 | Gottschlich ........... G06N 20/00 |
| 2018/0367563 | A1 | 12/2018 | Pfleger De Aguiar et al. |
| 2018/0375892 | A1 | 12/2018 | Ganor |
| 2019/0014153 | A1 | 1/2019 | Lang et al. |
| 2019/0083876 | A1 | 3/2019 | Morton et al. |
| 2019/0102564 | A1 | 4/2019 | Li et al. |
| 2019/0164015 | A1 | 5/2019 | Jones, Jr. et al. |
| 2019/0188615 | A1 | 6/2019 | Liu |
| 2019/0222593 | A1 | 7/2019 | Craig et al. |
| 2019/0258953 | A1 | 8/2019 | Lang et al. |
| 2019/0289029 | A1 | 9/2019 | Chawla et al. |
| 2019/0312890 | A1 | 10/2019 | Perilli |
| 2019/0356684 | A1 | 11/2019 | Sinha et al. |
| 2019/0370473 | A1 | 12/2019 | Matrosov et al. |
| 2020/0184053 | A1 | 6/2020 | Kursun |
| 2020/0201992 | A1 | 6/2020 | Hadar et al. |
| 2021/0168170 | A1 | 6/2021 | Asai et al. |

OTHER PUBLICATIONS

"Cyberspace Operations," U.S. Air Force, Air Force Policy Directive 10-17, accessible via https:/1as.org/irp/doddir/usaf/afpd10-17.pdf, Jul. 31, 2012, 9 pages.

2015 DFRWS Forensics Challenge—Submitted Solutions and Source Code Released, Retrieved from http://www.cs.uno.edu/-golden/gpumalware-research.html, 5 pages.

Atighetchi et al., "Metrinome-Continuous Monitoring and Security Validation of Distributed Systems", Journal of Cyber Security and Information Systems, vol. II, No. 1, Knowledge Management, Mar. 2014, 7 pages.

Baloch et al., "Comparative Study of Risk Management in Centralized and Distributed Software Development Environment", Sci. Int.(Lahore), vol. 26, No. 4, 2014, 6 pages.

Balzarotti et al.,"The impact of GPU-assisted malware on memory forensics: A case study", DFRWS 2015, 9 pages.

Becker et al., "Applying Game Theory to Analyze Attacks and Defenses in Virtual Coordinate Systems," 41$^{st}$ International Conference on Dependable Systems & Networks (DSN), Jun. 2011, 12 pages.

Challagulla et al., "Empirical Assessment of Machine Learning based Software Defect Prediction Techniques", Proceedings of the 10th IEEE International Workshop on Object-Oriented Real-Time Dependable Systems (WORDS'05), Feb. 2-4, 2005, 8 pages.

De Gusmao et al., "Abstract of Cybersecurity risk analysis model using fault tree analysis and fuzzy decision theory", 2018, International Journal of Information Management, pp. 1-3.

Fisher, "Developing Software in a Multicore & Multiprocessor World," Klocwork.com., white paper, Sep. 2010, 11 pages.

Jones, "Software Defect Origins and Removal Methods," International Function Point Users Group, Dec. 28, 2012, 31 pages.

Joyce et al., "MEGA: A Tool for Mac OS X Operating System and Application Forensics," Proceedings of the Digital Forensic Research Conference, Aug. 11-13, 2008, 8 pages.

Libicki, "Cyberdeterrence and Cyberwar", Rand Corporation, 2009, 240 pages.

McHale, "The Aegis Combat System's continuous modernization", Military Embedded Systems, retrieved from http://mil-embedded.com/articles/the-aegis-combat-systems-continuous-modernization/, Aug. 26, 2016, 8 pages.

Porche III et al., "A Cyberworm that Knows no Boundaries", RAND Corporation, 2011, 55 pages.

PR Newswire, "ATCorp Releases CSAS—Cloud Security Analysis Suite for Applications in the Cloud", Feb. 26, 2016, 4 pages.

Quinlan et al., "ROSE User Manual: A Tool for Building Source-to-Source Translators," Draft User Manual, Version D.9.6a, Lawrence Livermore National Laboratory, Dec. 16, 2015, 337 pages.

Rahman et al., "Defect Management Life Cycle process for Software Quality Improvement," World Academy of Science, Engineering and Technology International Journal of Computer and Information Engineering, vol. 9, No. 12, Nov. 24, 2015, 4 pages.

Richard, "Memory Analysis, meet GPU Malware", Oct. 22, 2014, CERIAS, Retrieved from http://www.cerias.purdue.edu/news_and_events/ events/ security seminar/details/index/popenihmencsf2v5mggg5ulfd4, 2 pages.

Robbio, "How Will AI Impact Software Development" Forbes Technology Council, Aug. 31, 2017, 16 pages.

ROSE: Main Page, Retrieved from http://rosecompiler.org/ROSE_HTML_Reference/, Mar. 29, 2017, 3 pages.

Schneier, "Attack Trees-Schneier on Security", Dr. Dobb's Journal, Dec. 1999, Retrieved from https://www.schneier.com/academic/archives/1999/12/attack_trees.html, 9 pages.

Shiva et al., "Game Theory for Cyber Security," Proceedings of the Sixth Annual Workshop on Cyber Security and Information Intelligence Research, Article No. 34, Apr. 2010, 10 pages.

Sironi et al., "Metronome: Operating System Level Performance Management via Self-Adaptive Computing," DAC 2012, Jun. 3-7, 2012, 10 pages.

Snyder et al., "Ensuring U.S. Air Force Operations During Cyber Attacks Against Combat Support Systems Guidance Where to Focus Mitigation Efforts," RAND Corporation, 2015, 37 pages.

Vasiliadis et al., "GPU-assisted malware", Int. J. Inf. Secur. 2015, Published, Aug. 28, 2014, 6 pages.

ATC-NY, SB172-007, D172-007-0014, Phase I SBIR Proposal, Silverline Human Performance Detection (Silverline-HPD), Jul. 20, 2017, 17 pages.

Xie et al., "Security Analysis on Cyber-Physical System Using Attack Tree", 2013 Ninth International Conference on Intelligent Information Hiding and Multimedia Signal Processing, IEEE Computer Society, IEEE, 2013, pp. 429-432, DOI: 10.1109/IIH-MSP.2013.113 (4 pages).

Xu et al., "A Minimum Defense Cost Calculation Method for Cyber Physical System", 2019 Seventh International Conference on Advanced Cloud and Big Data (CBD), IEEE, 2019, pp. 192-197, DOI: 10.1109/CBD.2019.00043 (6 pages).

"Cybersecurity," U.S. Department of Defense Instruction, No. 8500.01, Mar. 14, 2014, 58 pages,accessible via.https://www.esd.whs.mil/Portals/54/Documents/DD/issuances/dodi/850001_2014.pdf.

"CYDEST: CYber DEfense Simulation Trainer", Air Force SBIR/STTR Award Details, Phase I, Award Details Status: Completed (Invited for Phase II) Start: Apr. 13, 2005 End Jan. 13, 2006, retrieved on Aug. 30, 2020 from URL: http://www.itfsbirsttr.com/award/AWARDDetails.aspx?pk=12036 (2 pages).

"Identification and Significance of the Problem or Opportunity", Architecture Technology Corporation, Proposal No. F172-D12-0184, Topic No. OSD172-D12, 10 pages (undated).

Architecture Technology Corporation et al.", Cydest (Cyber Defense Simulation Trainer)," http://web.archive.org/web/20061107010247/www.atcorp.com/securesystems/cydest.html, Dec. 2005, 1 page.

ATC-NY et al.,"Cyber Defense Simulation Trainer (CYDEST)", CYDEST Congressional Briefing, Feb. 19, 2007, 1 page.

ATC-NY, OSD172-D11, F172-D11-0024, Phase 1 SBIR Proposal, "SilverlineRT", Jul. 20, 2017, 16 pages.

Bergstromb et al., "The Distributed Open Network Emulator: Using Relativistic Time for Distributed Scalable Simulation", Proceedings of the 20th Workshop on Principles of Advanced and Distributed Simulation, May 23-26, 2006, 7 pages.

(56) References Cited

OTHER PUBLICATIONS

Brueckner et al., "CYDEST Cyber Defense Simulation Trainer", ATC-NY a subsidiary of Architecture Technology Corporation, Oct. 29, 2007, 20 pages.
C.M.U. Entertainment Technology Center, "CyberSecurity", found at http://www.etc.cmu.edu/projects/cybersecurity/, Feb. 2000, 16 pages.
Carson et al., "NIST NET: A Linux-based network emulation tool" ACM SIGCOMM, Computer Communication Review, vol. 33, Issue 3, Jul. 2003, 16 pages.
Carver et al., "Military Academy Attack/Defense Network", IEEE Systems, Man, and Cybernetics Information Assurance and Security Workshop, West Point, NY, Jun. 17-19, 2002, 6 pages.
Crumb, Francis L., "Cyber Security Boot Camp graduates Class of '06", Academy Spirit, vol. 46, No. 33, Aug. 18, 2006, U.S. Air Force Academy, Colorado (1 page).
Crumb, Francis L., "Hackfest Highlights Cyber Security Boot Camp", Air Force Research Laboratory (AFRL) Information Directorate document, Oct./Nov. 2004 (1 page).
Davoli, "Virtual Square: all the virtuality you always wanted but you were afraid to ask," http://virtualsguare.org/copyright Renzo Davoli, May 27, 2004, 3 pages.
Davoli, "Virtual Square", Proceedings of the First International Conference on Open Source Systems, Genova, Jul. 11-15, 2005, 6 pages.
Duggirala et al., "Open Network Emulator", Jan. 15, 2005, available at URL: https://web.archive.org/web/2010*/http://csrl.cs.vt.edu/net_emulation.html (5 pages).
Edwards et al., "Hajime: Analysis of a decentralized internet worm for IoT devices", RapidityNetworks, Security Research Group, Oct. 16, 2016, pp. 1-18.
Final Office Action on U.S. Appl. No. 16/256,810 dated Jun. 3, 2021 (16 pages).
Home Invasion 2.0, "Attacking Network-Connected Embedded Devices", retrieved from the internet on Jun. 20, 2018, https://media.blackhat.com/us-13/US-13-Crowley-Home-Invasion-2-0-WP.pdf, 15 pages.
Honeynet Project, "Know Your Enemy: Defining Virtual Honeynets," http://old.honeynel.org/papers.virtual/, Jan. 27, 2003, 7 pages.
Howard et al., "A Common Language for Computer Security Incidents," Sandia National Laboratories Report, SAND9B 8667, Oct. 1998, 32 pages.
Joyce, "TrestleHSM: Hierarchical Security Modeling for Naval Control Systems", Phase 1 SBIR Proposal, Topic: N181-051, Unified Cybersecurity System Modeling of Naval Control Systems, Architecture Technology Corporation, 25 pages.
Keshav, "REAL: A Network Simulator," Computer Science Division, Department of Electrical Engineering and Computer Science, University of California, Berkeley, Dec. 1988, 16 pages.
Kimball, "Silverline Human Performance Detection (Silverline-HPD)", Phase 1 SBIR Proposal, Architecture Technology Corporation, SB172-007, D172-007-0014, Jul. 20, 2017, 17 pages.
Krishna et al., "V-Netlab: A Cost-Effective Platform to Support Course Projects in Computer Security", Department of Computer Science, Stony Brook University, Jun. 2005, 7 pages.
Lathrop et al., "Information Warfare in the Trenches: Experiences from the Firing Range," U.S. Military Academy, Security education and critical infrastructures, Kluwer Academic Publishers Norwell, MA, USA .copyright, Jun. 23-26, 2003, 21 pages.
Lathrop et al., "Modeling Network Attacks", 12th Conference on Behavior Representation in Modeling and Simulation, 2003, pp. 401-407 (8 pages).
Lathrop et al., "Modeling Network Attacks", 12th Conference on Behavior Representation in Modeling and Simulation, May 2003, pp. 19-26 (8 pages).
Liljenstam et al., "RINSE: The Real-Time Immersive Network Simulation Environment for Network Security Exercises", Proceedings of the 19th Workshop on Principles of Advanced and Distributed Simulation (PADS), Jun. 2005, 10 pages.
Maciel, et al. "Impact of a DDoS Attack on Computer Systems: An approach based on an Attack Tree Model," 2018 Annual IEEE International Systems Conference (SysCon), Vancouver, BC, 2018, pp. 1-8.
McDonald, Chris, "A Network Specification Language and Execution Environment for Undergraduate Teaching", ACM SIGCSE Bulletin, vol. 23, Issue 1, Mar. 1991, DOI: 10.1145/107005.107012 (10 pages).
McGrath et al., "NetSim: A Distributed Network Simulation to Support Cyber Exercises", Institute for Security Technology Studies, Dartmouth College, Huntsville Simulation Conference, Mar. 9-11, 2004, Huntsville, Alabama, 6 pages.
McHale, "The Aegis Combat System's continuous modernization", Military Embedded Systems, Retrieved on Mar. 22, 2020 from http://mil-Embedded.com/articles/the-aegis-combat-systems-continuous-modernization/, 8 pages.
McLinden, "Segmented Attack Prevention System for IoT Networks (SAPSIN)", Abstract—SBIR Phase 1 Proposal, DoD SBIR 2017.2, Proposal No. F172-D12-0184, Topic No. OSD172-D12, 1 page (undated).
Padman et al., "Design of a Virtual Laboratory for Information Assurance Education and Research", Proceedings of the 2002 IEEE, Workshop on Information Assurance and Security, U.S. Military Academy, West Point, Jun. 2002, 7 pages.
Proposal Author: Matthew Donovan; Topic Name and No. N182-131: Red Team in a Box for Embedded and Non-IP Devices; Title: Automated Cyber Evaluation System, Jun. 30, 2018, 24 pages.
Richard III, Golden G., "Memory Analysis, Meet GPU Malware", CERIAS, Oct. 22, 2014, retrieved 2021 from URL: https://www.cerias.purdue.edu/news_and_events/security_seminar/details/index/popenihmencSf2v5mggg5ulfd4 (3 pages).
Saic et al., "TeamDefend, A White Paper on Strengthening the Weakest Link: Organizational Cyber Defense Training", 17th Annual First Conference, Jun. 26-Jul. 1, 2005, 6 pages.
Saunders, "Simulation Approaches in Information Security Education", Proceedings of the Sixth National Colloquium for Information Systems Security Education, Redmond, Washington, Jun. 4-6, 2002, 15 pages.
Schafer et al., "The IWAR Range: A Laboratory for Undergraduate Information Assurance Education", Military Academy West Point, NY, Research paper, found at http://handle.dtic.mii/100.2/ADM08301, Nov. 7, 2000, 7 pages.
Schepens et al., "The Cyber Defense Exercise: An Evaluation of the Effectiveness of Information Assurance Education", 2003, 14 pages.
Sirianni, "A19-080 Cyber Security Tool Kits for Engineers and Soldiers," Phase 1 SBIR Proposal, Architecture Technology Corporation, 24 pages (undated).
Stumpf et al., "NoSE-building virtual honeynets made easy", Darmstadt University of Technology, Department of Computer Science, D-64289 Darmstadt, Germany, 2005, 11 pages.
Stytz et al., "Realistic and Affordable Cyberware Opponents for the Information Warfare BattleSpace," Jun. 2003, 42 pages.
Varga, "The OMNeT ++ Discrete Event Simulation System", Department of Telecommunications, Budapest University of Technology and Economics, Proceedings of the European Simulation Multiconference, Jun. 2001, 7 pages.
Vrable et al., "Scalability, Fidelity, and Containment in the Potemkin Virtual Honeyfarm," SOSP, Oct. 23-26, 2005, 15 pages.
Wang et al., "The design and implementation of the NCTUns 1.0 network simulator", Computer Networks, vol. 42, Issue 2, Jun. 2003, 23 pages.
White et al., "Cyber Security Exercises: Testing an Organization's Ability to Prevent, Detect and Respond to Cyber Security Events," Proceeding of the 37th Hawaii International Conference on System Sciences, Jan. 2004, 10 pages.
Wikipedia—OpenCL, Mar. 29, 2017, Retrieved from https://en.wikipedia.org/wiki/OpenCL, 23 pages.
Wu et al., "An Attack Modeling Based on Hierarchical Colored Petri Nets", 2008 International Conference on Computer and Electrical Engineering, Phuket, 2008, pp. 918-921.
Xu et al., "Attack Identification for Software-Defined networking based on attack trees and extension innovation methods," 2017 9th

(56) References Cited

OTHER PUBLICATIONS

IEEE Intl. Conf. on Intelligent Data Acquisition and Advanced Computing Systems: Technology and Applications (IDAACS), Bucharest, 2017, pp. 485-489.
Zeng et al., "GloMoSim: A Library for Parallel Simulation of Large-scale Wireless Networks" ACM SIGSIM Simulation Digest, vol. 28, Issue 1, Jul. 1998, 8 pages.

* cited by examiner

SYSTEMS AND METHODS FOR DETECTING NON-MALICIOUS FAULTS WHEN PROCESSING SOURCE CODES

CROSS-REFERENCE TO RELATED APPLICATIONS

This application is a continuation application of U.S. application Ser. No. 16/012,695, filed Jun. 19, 2018, entitled "Systems and Methods for Processing Source Codes to Detect Non-Malicious Faults," which is hereby incorporated by reference in its entirety.

This application relates to U.S. application Ser. No. 15/485,784, filed Apr. 12, 2017, entitled "Software Assurance System for Runtime Environments," and U.S. application Ser. No. 15/622,434, filed Jun. 14, 2017, entitled "Software Assurance for Heterogeneous Distributed Computing Systems," each of which is hereby incorporated by reference in its entirety.

TECHNICAL FIELD

This application relates generally to field of information systems, and more specifically to methods and processes for distinguishing between malicious and non-malicious faults in source codes.

BACKGROUND

Computer source code may introduce various security flaws and vulnerabilities. For example, a computer virus may be included as a section of a source code that is buried or hidden in another program. Once the program is executed, the source code for the virus is activated and attaches itself to other programs in the system. Infected programs in turn copy the virus to other programs. In this manner, viruses may spread throughout the computing system and, potentially, to other computing systems via network connections. The effect of such viruses can cause serious problems such as the destruction of programs and data. A computer virus is merely an example, and there may be other vulnerabilities and security flaws that may be maliciously coded within source code for non-malicious software products.

To combat the increasing problem of security flaws and vulnerabilities, such as computer viruses, many computer users employ the use of protection programs to detect data packets that may contain viruses and then eliminate them before the program associated with the data packet may be run. Existing protection programs typically employ pattern matching to identify malicious code. Pattern matching is a process wherein a software file is scanned and its source code compared against historical patterns stored in its database. For example, existing cyber security code analysis software typically focus only on identifying faults by scanning source code, and flagging any source code structure that introduces a security flaw or vulnerability into a software program under test, based on matching of scanned data against virus patterns stored in its database, where the security flaw or vulnerability would allow an adversary to inject a virus or creates an opening for a hacker to exploit. The results from such software typically lead to significant numbers of false positives, because common software coding errors are flagged alongside actual inserted malicious code. This is because the existing software evaluates the source code in question without considering a context in which the source code was written by engineers, and thus is not capable of taking into account human behaviors that inevitably affect quality and security of the source code written by the engineers experiencing those behaviors.

It has been studied that human behaviors, such as fatigue, personal stress, and work-related stress, can impact the quality of the source code produced by otherwise competent software engineers and software developers. One specific example of a human behavior that impacts software engineers and software developers is decision fatigue. Decision fatigue is a psychological term that refers to a mental strain that occurs when a software engineer expels a lot of mental energy to perform intellectual tasks. The more choices a software engineer is forced to make, the harder each one becomes for the brain of the software engineer. When a software engineer's mental energy is depleted, the brain of the software engineer will often compensate by looking for shortcuts in decision making. As a result, the brain of the software engineer will often turn to either impulsive behavior or complete avoidance of decisions. Such a brain phenomenon come into play in a software engineer's daily tasks, as the software engineer spends every day making decisions, both small and large. A common example of the decision fatigue is in software programming when the software engineer copy-and-paste source code. Frequently, the software engineer finds that reusing source code that is already a part of their software program will allow them to successfully address another section of the source code. A known method to achieve such an objective of copying-and-pasting source code is to refactor a section of the source code so that it seamlessly supports each use of the source code while carrying over all important and relevant source code and its dependencies into the overall software program. However, completely refactoring the source code structure is not always the easiest method, as it requires a number of small decisions about how to support both uses and confirming that new bugs are not created during the software programming process. As a result, a software engineer dealing with the decision fatigue may decide to simply copy-and-paste the source code instead, and in doing so, may inadvertently create a new security flaw, or more likely, the software engineer may later notice a security flaw in the source code and only resolve it in one place, forgetting that the flaw exists in the copy-pasted place in the overall software program as well.

Accordingly, there will inevitably be security flaws inadvertently written into a software program that are a direct result of natural human behaviors like decision fatigue, personal and professional stress, inattentiveness, and inexperience. Such security flaws are not indicative of a larger cyber security threat or malicious actor. However, existing cyber security code analysis software tools will lump actual malicious security flaws with inadvertent flaws, and when users operating the cyber security code analysis software are unable to distinguish between malicious attacks and benign security flaws, the user will often have to allocate resources to resolve each of the security flaws with few meaningful metrics to use when prioritizing the identified security flaws. Also, false positives corresponding to the inadvertent security flaws often result in manpower and resources being dedicated to counteracting cyber security attack that isn't even occurring. Additionally, when software systems are overloaded with identification of false positives, alerts for actual malicious attacks are buried, and not properly addressed in time because there is no direction to engineers as to which security flaw(s) present a greatest threat, and the engineers run a risk of wasting vast amounts of time and resources tracking down and resolving accidental security flaws, when their limited resources should first be focused on actual cyber-attacks.

SUMMARY

What is therefore desired are systems and methods that reduces the risk of false positives by identifying portions of source code where the quality of the source code has been affected by normal human behavior, and then scanning the source code for identifying anomalies and prioritizing the scanned results based upon a likelihood that the identified anomalies are malicious attacks versus non-malicious, inadvertent mistakes caused due to human behavior.

Embodiments disclosed herein may solve a technical problem of current cyber security tools designed for identifying security flaws in a source code, but fail to distinguish between the security flaws caused by an insertion of malicious source code and the security flaws caused by human behavioral factors such as fatigue, inattentiveness, and inexperience experienced by engineers who write the source code. The failure to distinguish between malicious and accidental security flaws results in false positives. To solve the problem of false positives, embodiments disclosed herein describe a software analysis tool that identifies human behaviors associated with patterns in source code, and categorizes security flaws and vulnerabilities in the source code by the human behavior or malicious intent that led to an occurrence of such security flaws and vulnerabilities. The software analysis tool utilizes natural language processing techniques and machine learning technology to parse the source code and identify patterns that are indicators of human behaviors causing security flaws within the source code. The software analysis tool then processes categorized source code to identify security flaws and vulnerabilities, and results of the processing of the categorized source code is returned to a user analyzing and evaluating each security flaw and vulnerability in the source code and the human behavior or malicious intent that caused it. Thus, by using the software analysis tool during the testing stage of development, an engineer can quickly scan the source code, automatically identify security flaws in the source code and what caused the security flaws, and use identified information to appropriately address the security flaws. To appropriately address the security flaws, the software analysis tool prioritizes the security flaws based on a likelihood that each security flaw is malicious and a degree of danger the security flaw imposes. The use of disclosed software analysis tool reduces the amount of false positives and enables engineers to immediately focus their attention on the malicious security flaws introduced by an adversarial source to prevent a breach, while still keeping track of minor benign security flaws that should be addressed at some point in the future. Thus, the software analysis tool manages multiple sources of data and integrates human and technical aspects to minimize false positives. The software analysis tool may be used in a number of environments and vulnerable sectors such as finance, healthcare, and transportation.

In some embodiments, a computer implemented method may include receiving, by a computer, one or more source code files containing a machine readable source code and non-executable embedded comments. The computer implemented method may further include receiving, by the computer, one or more log files containing timestamps for check-ins and check-outs of the one or more source code files in a source code repository. The computer implemented method may further include executing, by the computer, a machine learning model on the one or more source code files and the one or more log files, whereby the machine learning model performs a sentiment analysis of the machine readable source code and the non-executable embedded comments and performs pattern analysis of the timestamps. The computer implemented method may further include generating, by the computer, one or more annotated source code files identifying one or more anomalies based on the sentiment analysis, the pattern analysis, and a software assurance tool. The computer implemented method may further include identifying and ranking, by the computer, one or more threat levels based on the one or more anomalies. The computer implemented method may further include displaying, by the computer, a ranked list of the one or more threat levels on a graphical user interface.

In some embodiments, a system may include a non-transitory storage medium hosting a source code repository and a processor coupled to the non-transitory storage medium. The processor is configured to receive one or more source code files containing a machine readable source code and non-executable embedded comments; receive one or more log files containing timestamps for check-ins and check-outs of the one or more source code files in the source code repository; execute a machine learning model on the one or more source code files and the one or more log files, whereby the machine learning model performs a sentiment analysis of the machine readable source code and the non-executable embedded comments and performs pattern analysis of the timestamps; generate one or more annotated source code files identifying one or more anomalies based on the sentiment analysis, the pattern analysis, and a software assurance tool; identify and rank one or more threat levels based on the one or more anomalies; and display a ranked list of the one or more threat levels on a graphical user interface.

BRIEF DESCRIPTION OF THE DRAWINGS

The accompanying drawings constitute a part of this specification and illustrate embodiments of the subject matter disclosed herein.

DETAILED DESCRIPTION

Figure 1:
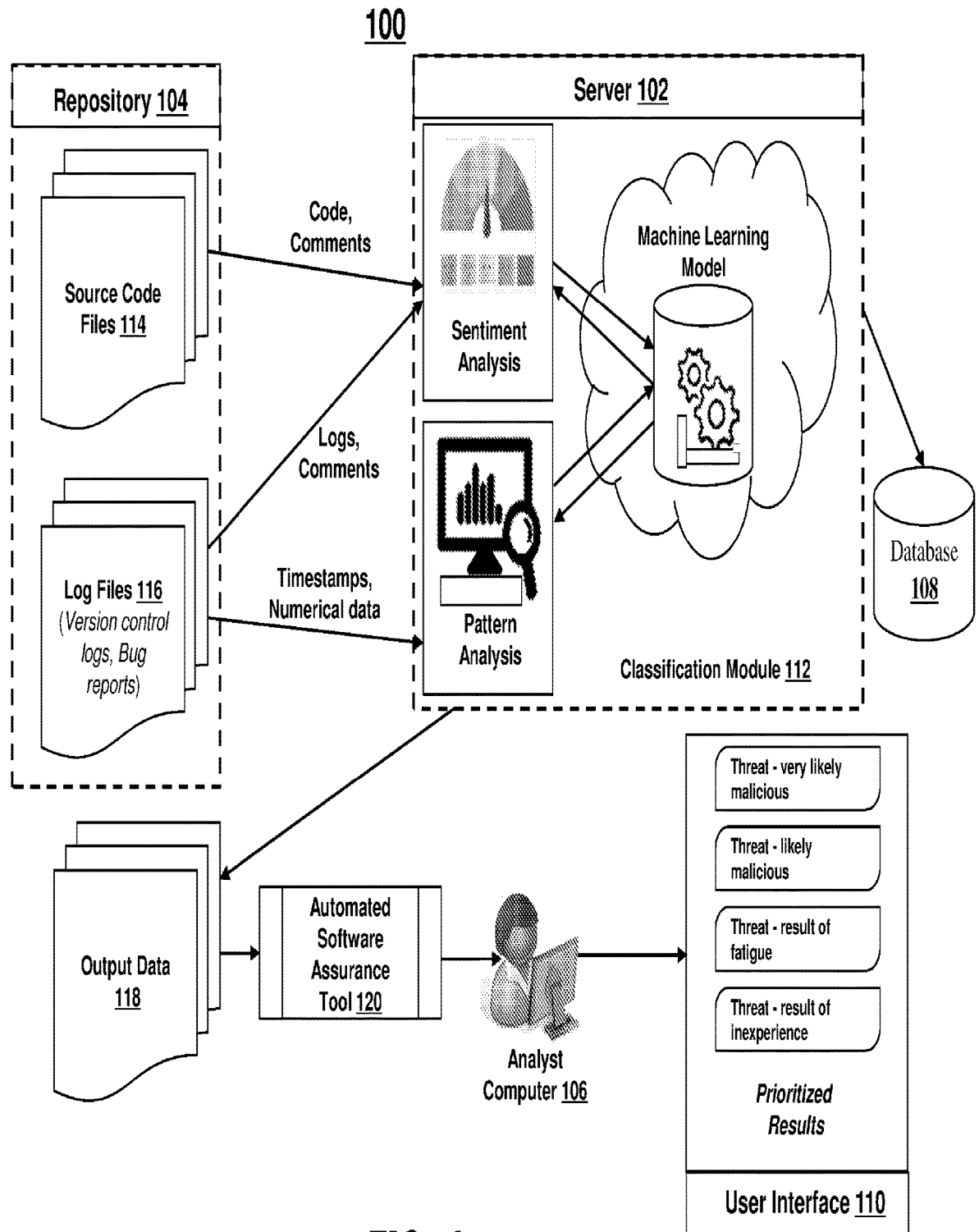
FIG. 1 illustrates a system for distinguishing between malicious and non-malicious source codes, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Information systems described herein may be used for military applications, and comprise novel software and hardware tools to associate human behaviors, across software development lifecycle, for detection of correct versus faulty source code within a developed software program. Conventional methods for accurately identifying and analyzing different human behaviors and factors within the software development processes may result in the faulty source code, and therefore impact safety and security of resulting mission-critical military applications. Also, the conventional methods focus on identifying faults in the source code using techniques that scan the source code for the faults. Such conventional methods may apply potentially privacy-invading techniques, such as behavioral anomaly detection to identify malicious intent within the source code. These methods will also result in significant false positives, as it is difficult to distinguish normal from abnormal human behavior (e.g., a difference between a delay in correctly implementing a security function in a source code while an engineer researches an accurate implementation, and an omission in the source code due to the engineer fatigue). Furthermore, using the conventional methods, it is difficult to distinguish simple programming errors from systematic insertion of malicious source code. In order to address the afore-mentioned problems of conventional methods, the software and hardware tools described herein identifies and analyzes human characteristics that impact software development processes and significantly increases identification of faulty and/or insecure source code prior to the deployment of the developed software. The software and hardware tools are based on mechanisms corresponding to multidimensional analysis and modeling of an individual engineer and a group of engineers behavioral characteristics (e.g., patterns of software development activity, form of communication amongst software engineers and developers and content of communication amongst software engineers and developers), in conjunction with comprehensive analysis of the source code over a predetermined period of time.

FIG. 1 illustrates a system 100 configured to identify software engineer behaviors linked with source code structures, distinguish between normal behavior and unusual behavior of the software engineer, and further distinguish between malicious and non-malicious anomalies within the source code.

A system 100 may include a server 102 such as a cloud server computer, a source code repository 104, an analyst computer 106, and a database 108. The server 102, the source code repository 104, the analyst computer 106, and the database 108 are connected to each other through a network. The examples of the network may include, but are not limited to, private or public LAN, WLAN, MAN, WAN, and the Internet. The network may include both wired and wireless communications according to one or more standards and/or via one or more transport mediums. The communication over the network may be performed in accordance with various communication protocols such as Transmission Control Protocol and Internet Protocol (TCP/IP), User Datagram Protocol (UDP), and IEEE communication protocols. In one example, the network may include wireless communications according to Bluetooth specification sets, or another standard or proprietary wireless communication protocol. In another example, the network may also include communications over a cellular network, including, e.g. a GSM (Global System for Mobile Communications), CDMA (Code Division Multiple Access), EDGE (Enhanced Data for Global Evolution) network.

In operation, a server 102 may execute a classification module 112 on source code files 114 retrieved from a repository 104, which may scan the source code files 114 to identify patterns in the source code files 114 that are associated with human behavior and/or malicious characteristics, using additional information associated with log files 116 of a developer who wrote the source code. The classification module 112 may then annotate the source code files 114 having patterns of the human behaviors/malicious characteristics. After the source code files 114 has been annotated, the annotated source code files 114 may be processed by a software assurance tool 120 for identification of anomalies which human behavior and other malicious characteristics are likely to be associated with. The server 102 may then rank all anomalies by a likelihood that the anomalies resulted from a malicious attack, which will reduce an amount of false positives, and thereby enable security analysts operating analyst computers 106 to immediately focus their attention on the malicious anomalies to prevent a security breach, while still keeping track of minor anomalies resulting from flawed human behavior that should be addressed at some point in the future.

A classification module 112 may include a machine learning algorithm, and is trained using a dataset. The dataset may include a large amount of data including source code where structures with anomalies within the source code are identified. A sentiment analysis is performed on source code itself and data such as comments, version control logs, and bug reports to identify specific sentiments wherever possible. In some cases, manual evaluation may be performed to identify each instance and cause of an anomaly. The results of the evaluation are stored in the database 108. The dataset is used to train the algorithm of the classification module 112 to identify sentiments and behaviors in a test software code based on language structure and numerical patterns of the test source code.

Servers 102 may be any computing device comprising a processor and non-transitory machine-readable storage medium, and capable of performing various tasks and processes described herein during execution. Non-limiting examples of the server 102 may include a desktop computer, a mobile computer, a laptop computer, a tablet computer, and the like. For ease of explanation, FIG. 1 shows a single computing device functioning as the server 102. However, it should be appreciated that some embodiments may comprise any number of computing devices capable of performing the various tasks described herein.

The system 100 described herein may operate in a cloud-computing environment where the servers 102 are cloud-optimized and communicate data associated with one or more tasks with the analyst computer 106. All data and application programs may be stored and executed on a cloud-based server 102 accessed over a network cloud. In the cloud computing environment, a web browser on the analyst computer 106 may interface with an application program and models that are executed on the cloud-based server 102.

A server 102 may execute multiple software modules such as a classification module 112 comprising one or several routines. The classification module 112 may implement a machine learning model to analyze source code files 114 and metadata available for the source code files 114 such as log files 116 comprising comments, version control logs, revert logs, issue reporting logs, and bug reporting logs. The model may execute a sentiment analysis tool and/or a pattern analysis tool to perform sentiment analysis and/or pattern analysis of the source code files 114 and the log files 116 by processing and analyzing the source code files 114 and the log files 116. In some embodiments, the model may execute the sentiment analysis tool and/or the pattern analysis tool, using natural language processing technologies, to analyze the source code files 114 and the log files 116 for identifying and recording any sentiments and patterns associated with individual source code structures, including comments corresponding to the source code through version control logs, bug reports, and textual comments in the source code files 114.

To process and analyze the source code files 114 and the log files 116, the model (via the sentiment analysis tool and/or the pattern analysis tool) may initially parse source code files 114 and log files 116. The model may then process all parsed data within the source code files 114 and the log files 116 using a natural language processing tool, and performing sentiment analysis and/or pattern analysis to identify which human behavior(s) and pattern(s) are associated with structures of the source codes.

A sentiment analysis tool may then perform sentiment analysis to identify human behavior characteristics experienced by customers through performing natural language processing on the parsed source code that they wrote. A model may select any suitable sentiment analysis tool to effectively analyze the source code, and train the sentiment analysis tool with a complex set of data geared specifically toward the goal of analyzing the source code. In some embodiments, the model may incorporate machine learning in order to allow the sentiment analysis tool to learn and improve over a period of time. The sentiment analysis tool may perform sentiment analysis by analyzing software program language, such as the source codes, then tokenizing the source codes into separate connected tokens, and lastly creating a mathematical representation of a string of source codes, in a form of a vector, where each token represents a point on the vector. As a mathematical vector, a string of source codes may be grouped with other similar codes that are likely displaying similar sentiments by measuring a distance between vectors in a multidimensional space.

An output of a sentiment analysis tool upon performing analysis of both text communication such as comments within log files 116 and source code within source code files 114 is a list of sentiments associated with each source code structure or comment, including comments from version control logs and bug tracking reports, within log files 116 and source code files 114. In some embodiments, an output of a sentiment analysis tool may be a list of sentiments associated with each source code structure or comment, including comments from version control logs and bug tracking reports, within log files 116 and source code files 114 along with a relevance score for each sentiment listed. The output data is then displayed on a user interface 110 of an analyst computer 106 or any other device. In some embodiments, the output data is stored in a database 108, which may be used to train various models stored in the database 108. In some embodiments, the output data may be stored in a database 108, along with other numerical pattern data, which may be processed to narrow the sentiment assigned to each source code structure or comment, including comments from version control logs and bug tracking reports down even further, and to identify other behaviors that a sentiment analysis tool may miss, such as inexperience or inattentiveness of a customer.

In some embodiments, a sentiment analysis tool, such as Python's Natural Language Toolkit (NLTK), may be used to perform sentiment analysis of both text communication such as comments within log files 116 and source code within source code files 114. In some embodiments, General Architecture for Text Engineering (GATE) and Stanford's Natural Language Processing (NLP) tools, may be used to perform sentiment analysis of both text communication such as comments within log files 116 and source code within source code files 114. A sentiment analysis tool may be selected that has an optimal performance in classifying text communication such as comments within log files 116 and source code within source code files 114, and can be modified to adapt to the requirements of the system 100. A set of data, including source code with known sentiments attached, may be used for training any sentiment analysis tool described above to adapt to the requirements of the system 100.

A pattern analysis tool may process and analyze parsed log files 116 associated with source code files 114. The log files 116 may contain text comments in the source code files 114, version control logs, and bug reports where the customers are using text language to communicate with other developers. Using the pattern analysis of the quantitative data such as timestamps and numerical data in the log files 116, the model may identify numerical and time-series patterns in non-text data from version control logs and bug reports such as timestamps from commits, reports, reverts, merges, and more. The model then evaluates numerical and time-series patterns to identify anomalies that may be indicative of unusual behavior in version control logs and bug reports. For example, if a single code structure was committed and reverted several times in a relatively short time window, the pattern analysis tool may identify an unusual pattern. If such unusual pattern is frequently identified among structures of the source code that are related to a specific human behavior (e.g. inattentiveness) as determined by the sentiment analysis tool, then such unusual pattern may be used as an identifying factor for a same behavior in later analyses. The model may constantly analyze the data in the log files 116 to determine where a pattern within the data directs to a specific human behavior characteristic in the past, and keep a record of all patterns that are deemed unusual, and identify such unusual patterns in future analyses of code of software programs as well. Similarly, the model may be able to recognize if an "unusual" pattern is viewed more frequently, indicating that said pattern is not necessarily as unusual as originally determined. The model may be updated as customers provide feedback regarding accuracy of output generated by the model, so that classifications of the source code files 114 become more effective as the model is trained and operated over a period of time.

A pattern analysis tool may be generated by identifying multiple sources from which useful supplemental data may be retrieved, and how to extract the supplemental data. In some embodiments, version control systems (e.g., Git, SVN, CVS) may maintain logs with a large amount of data detailing each action including commits, pushes, pulls, reverts, merges, and more, depending on a software application platform being used. From this data, timestamps may be obtained to analyze and find time patterns that could indicate a problem or behavior the customer was experiencing. For example, if there were several reverts in a row or multiple issues reported shortly after a commit, it is indicative of a larger problem with the source code. Another source for the training data may be bug reporting systems like Bugzilla. When combined with timestamps from version control, timestamps and other metadata from the bug reports may provide information about a state of software program at a given point in time.

In some embodiments, a pattern analysis tool may initially select information within at least one version control system and at least one bug tracking system to process and analyze. The information may be processed to identify timestamps. For instance, one or more data points in the time-series analysis of the information may include a list of dates such as weekends and national holidays in which customers were likely not working. Then, the pattern analysis tool may determine correlation between source code that is committed at the end of the day before a long weekend and inattentiveness or some other similar behavior of the customer at the same time.

After selecting the at least one version control system and the at least one bug tracking system, a pattern analysis tool may execute scripts and/or instructions to retrieve relevant data from the at least one version control system and the at least one bug tracking system. The retrieved data is then analyzed using time-series algorithms executed by the pattern analysis tool. Each data point within the retrieved data may be plotted according to its timestamp, and each pattern found within the retrieved data is based on a linear regression and vector representation, which may be documented along with a number of times that pattern is found within retrieved data. Each pattern of interest that is found by the pattern analysis tool is recorded and sent to an analyst. Information associated with each pattern of interest is formatted by the pattern analysis tool in a way that it can easily be added as a point on a vector for each source code structure that is referenced in a version control log or a bug report being analyzed. For example, a linear regression that was calculated from a time series, a number of times per day a file was committed, a score of the "normalness" of a pattern, are all converted to a point on a multidimensional vector.

A server 102 may generate an output data 118 comprising annotated source code, with each source code structure is classified by human behavior(s) likely experienced by a customer who wrote the source code. An automated software assurance tool 120 may then analyze a classified source code to identify security threats and security flaws. The tool 120 may identify the security threats and the security flaws in the source code through a combination of source code analysis (via third-party tools) and runtime tracing, using both rule sets and machine learning. The tool 120 may determine an impact of the security threats to overall cyber security system of the system 100. In some embodiments, the tool 120 may also take into an account the human behavior associated with the source code structures, and then prioritizes the security threats determined using a ranking technique that combines a likelihood that the security threat is malicious with a level of danger presented by the security threat. Accordingly, the ranking technique may resolve a false-positive problem by prioritizing likely malicious threats, while still enabling an analyst to view all threats that were found on an analyst computer 106.

Analyst computers 106 may be computing devices that security analysts may use to analyze and mitigate threats and/or alerts (corresponding to threats) generated by a server 102. An analyst computer 106 may be any computing comprising a processor and capable of performing the various tasks and processes described herein. Non-limiting examples of an analyst computer 106 may include laptops, desktops, servers, tablets, and smartphones. An analyst computer 106 may be coupled via one or more internal or external networks to a database 108. Software executed by the analyst computer 106 permits an analyst to select an alert corresponding to a security threat from the database 108 and then review or update threat data stored in the database record for the selected alert. Based on a risk score calculated for threat, the threat may be categorized into multiple categories such as very malicious or result of fatigue. The analyst computer 106 presents an analyst with an alert record corresponding to the risk of the threat to address next. The risk score may prioritize the queue for the analyst computer 106 and can continuously update the risk score, and thus the prioritization, within the queue. Addressing an alert can reduce queue volume because addressing an alert can address multiple underlying alerts, thereby reducing the resources required to host an ever-growing database of the alerts.

GUI 110 of the analyst computer 106 may receive alerts that are related to subject matter (e.g., type of threat) or procedural role (e.g., time-sensitive threat) of the respective analyst. In some implementations, alerts may have a data field indicating identifying the nature of the potential threat and another data field indicating a time-sensitive nature of the potential threat. Based on this data field, the analyst computer 106 may receive alerts having subject matter or procedural data fields associated with the analyst credentials. For instance, the analyst credentials of an analyst specializing in time sensitive alerts would indicate to the analyst computer 106 that the analyst computer 106 should retrieve and present an alert having a data field indicating that the particular alert is time sensitive. Similarly, the analyst computer 106 may receive updates or notification messages that the analyst computer 106 presents on a GUI to the analyst. A server 102 or other device of the system 100 may trigger and transmit the notification to each analyst computer 106 having analyst credentials with access attributes indicating the role of the analyst. For instance, an analyst may have analyst credentials with attributes that indicate the analyst specializes in handling time-sensitive alerts. When a new alert is generated or an existing alert is updated with a data field indicating the alert is time sensitive, the server 102 or other device may transmit a notification message to the analyst computer of the analyst computer 106.

In some implementations, an analyst computer 106 may have a GUI that allows an analyst to mark or "tag" an alert. A data field in the record of the alert is then updated to reflect the tag inputted by the analyst computer 107. In some instances, the tag reflects an analyst's concern that an alert may contain data fields that could be cross-referenced and found in another alert. The server 102 or other device of the system 100 may then perform various forms of processing on the data fields, such as identifying which, if any, other alerts contain the same data in corresponding data fields. In some embodiments, the server 102 or other device of the system 100 may execute various models that indicate to the server 102 that an alert should be "tagged." Alerts may be tagged automatically when data fields in an alert matches a threshold number of data fields of a given alert model.

A repository 104 may be hosted on one or more computing devices, where the repository 104 may store data records associated with various aspects of the software coding application services offered to end customers. Non-limiting examples of what may be stored in the repository 104 may include customer records that may comprise data fields describing customers, e.g., customer data, such as customer credentials (e.g., username, passwords, biometrics, encryption certificates); document records that may comprise machine-readable source code files 114 and parsed portions of such source code files 114, and metadata associated with such source code files 114 such as log files 116; and application data that may include software instructions executed by a customer device 110 or data used by the such software applications executed by the customer device 110. The repository 104 may be hosted on any number of computing devices comprising a non-transitory machine-readable storage medium and capable of performing the various tasks described herein. As shown in FIG. 1, the repository 104 may be accessed by a server 102 and other servers and devices of the system 100 via one or more networks. The repository 104 may be hosted on the same physical computing device functioning as the customer device 110 and/or functioning as other servers and devices of the system 100.

Databases 108 may be hosted on a server 102, and are capable of storing threat information and/or corresponding alerts in plain format and/or encrypted version containing data fields. The databases 108 may be in communication with a processor of the server 102, where the processor is capable of executing the various commands of the system 100. In some embodiments, the databases 108 may be part of the server 102. In some embodiments, the databases 108 may be a separate component in communication with the server 102.

The databases 108 may include various sub-databases where each sub-database is configured to store threat information and/or corresponding alerts of certain types. The sub-databases be in communication to each other via a network and include a non-transitory machine-readable storage media capable of receiving, storing, updating threat information and/or corresponding alerts stored in the databases 108. The databases 108 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the server 102.

In some embodiments, a memory of the databases 108 may be a non-volatile storage device for storing threat information and/or corresponding alerts data and instructions, to be used by a processor of the server 102. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, a memory of databases 108 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Figure 2:
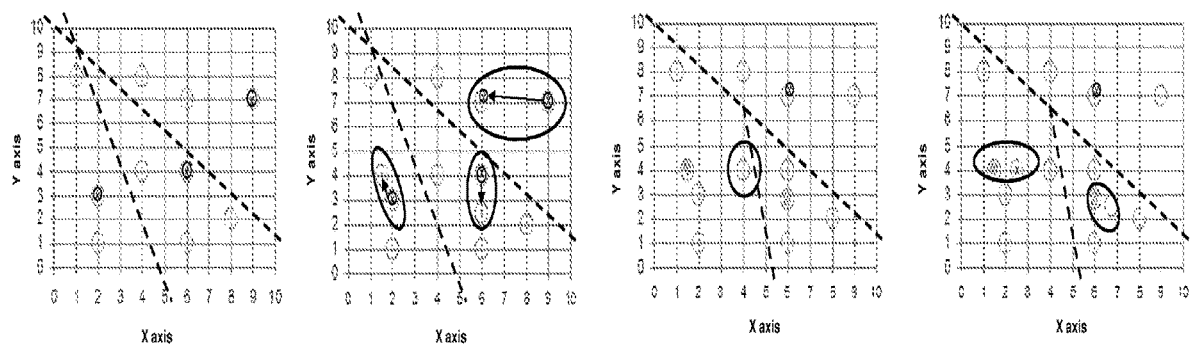
FIG. 2 illustrates graphs depicting working of K-means clustering algorithm, according to an embodiment.

FIG. 2 illustrates graphs 200 depicting working of K-means clustering algorithm. As discussed in FIG. 1, a model may implement sentiment analysis and pattern recognition tools to analyze source code by categorizing the source code by behavior(s) of customers were likely experiencing as the customers wrote the source code. After the source code is classified, the model may then perform cyber-security examination to locate potential security threats within the source code. Based on the examination, the model may determine a likelihood that a security threat is malicious, based on the behaviors that are associated with each structure of the source code. A model may then generate an output comprising a list of security threats ranked in order of a likelihood along with a level of danger that the security threat presents.

A model corresponds to a machine learning algorithm configured to classify source code by behavior of a customer who wrote it. The machine learning algorithm may be a clustering algorithm and/or an ensemble learning algorithm, which may use information from a database storing training data, which may be used in determining a classification of each structure of the source code. The training data may include source code, version control logs, and bug tracking reports. A table or an entry in the table is generated for each data element within the training data that maybe used to classify new source code. The training data may also be used to build a vector for each structure of the source code, which is to be classified.

In some embodiments, a clustering algorithm may be designed and utilized for distinguishing between malicious and non-malicious source codes. The clustering algorithm may be a k-means clustering algorithm, which is a method of vector quantization for cluster analysis in data mining. k-means clustering partitions n observations into k clusters in which each observation belongs to the cluster with the nearest mean, serving as a prototype of the cluster. For example, k-means clustering algorithm operates by placing each vector, which represents a single source code structure, on a multidimensional plane. The first K (where K equals some constant) vectors will become single element clusters, with a centroid placed on each of the sample vectors. As the remaining samples are incorporated, the samples are added to a cluster with a nearest centroid in a vector space. After each individual sample is assigned, the centroid of the cluster with the added element is recomputed to find the more accurate center. Then each sample is computed again to determine if the sample is in fact in the cluster with a nearest centroid, and if not said sample is re-classified to belong to the closer cluster. The clustering process is iterative, where the steps are executed until all samples are assigned and a pass through each sample causes no new assignments.

The graphs 200 depicts working of k-means clustering algorithm. First, centroids are placed on a first K (in example case, K=3) samples, then clusters are formed based on each sample's distance to a closest centroid. After initial clusters are formed, a centroid is recalculated to be in a center of its cluster. After that computation, a distance between each sample and each centroid is recomputed to determine if it is actually closer to a different centroid, and thus belonging to a different cluster. The samples are then reassigned to the appropriate cluster. These steps repeat until there are no more possible reassignments. In the graphs 200, a second graph 200b and a third graph 200c depicts that a sample initially belonging to a first cluster is re-classified to belong to a second cluster, after a centroid of each group is recomputed.

In some embodiments, an ensemble learning algorithm may be designed and utilized for distinguishing between malicious and non-malicious source codes. The ensemble learning algorithm may include multiple classifying algorithms. Each algorithm classifies a set of data, and then an average, sometimes weighted, is taken to determine an aggregate classification result. The algorithms may include a clustering algorithm like K-means, and other classifying algorithms such as Naïve Bayes and Markov chain prediction models. The use of ensemble learning algorithm may result in fewer occasions for bias or outliers to affect the final output results, and provides for a more robust testing strategy.

Figure 3:
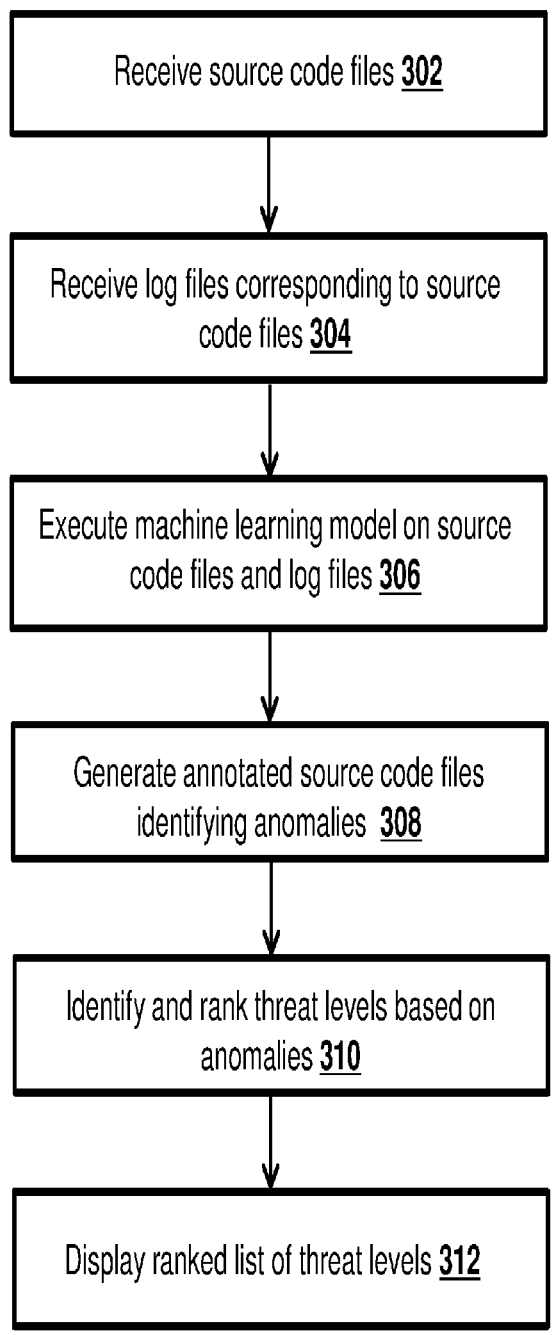
FIG. 3 illustrates a method for distinguishing between malicious and non-malicious source codes, according to an embodiment.

FIG. 3 shows execution of a method to identify software engineer behaviors linked with source code structures, distinguish between normal behavior and unusual behavior of the software engineer, and further distinguish between malicious and non-malicious anomalies within the source code, according to a method 300. The method 300 shown in FIG. 3 comprises execution steps 302, 304, 306, 308, 310, and 312. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of the FIG. 3 is described as being executed by a single computer in this embodiment. However, one having skill in the art will appreciate that, in some embodiments, steps may be executed by any number of computers operating in a distributed computing environment. In some cases, a computer executing one or more steps may be programmed to execute various other, unrelated features, where such computer does not need to be operating strictly as the computer described herein.

In a first step 302, a computer is configured to receive one or more files from a database. In some embodiments, a computer may generate a request to receive one or more files, and then transmit the request to a server computer and/or a database. Upon receipt and processing of the request by the server computer and/or the database, the server computer and/or the database may transmit the one or more files to the computer. The one or more files may be one or more source code files containing a machine readable source code and non-executable embedded comments.

In a next step 304, a computer is configured to receive one or more another set of files from a database. In some embodiments, a computer may generate a request to receive one or more another set of files, and then transmit the request to a server computer and/or a database. Upon receipt and processing of the request by the server computer and/or the database, the server computer and/or the database may transmit the one or more another set of files to the computer. The one or more another set of files may be one or more log files containing timestamps for check-ins and check-outs of the one or more source code files in a source code repository.

In a next step 306, a computer is configured to execute a machine learning model on one or more source code files and one or more log files. Upon execution, the machine learning model first performs a sentiment analysis of the machine readable source code and the non-executable embedded comments, and secondly performs pattern analysis of the timestamps. In some embodiments, upon execution the machine learning model, a sentiment analysis of the machine readable source code and the non-executable embedded comments, and a pattern analysis of the timestamps may be performed at the same time.

A sentiment analysis tool may perform the sentiment analysis of the machine readable source code and the non-executable embedded comments. The sentiment analysis tool may correspond to a k-means clustering algorithm. The k-means clustering algorithm may operate by placing each vector, which represents a single code structure, on a multidimensional plane. A pattern analysis tool may perform the pattern analysis of the timestamps by analyzing check-ins and check-outs logs of the one or more source codes.

In some embodiments, a computer may first generate and train a machine learning model configured to analyze the one or more source code files and the one or more log files. For training the machine learning model, the model may receive an input of a dataset based on earlier source code and log data analyzed by the sentiment analysis and the pattern analysis. The computer may iteratively update the dataset for the machine learning model based on any new source code and log data being analyzed by the sentiment analysis and the pattern analysis.

In a next step 308, a computer is configured to generate one or more annotated source code files identifying sentiments/behavior based on the sentiment analysis and the pattern analysis. In some embodiments, the computer may annotate the one or more source code files by marking the sentiments/behavior at a location in the one or more source code files where the sentiments/behavior are identified based on the sentiment analysis and the pattern analysis.

In a next step 310, a computer is configured to process one or more annotated source code files using a software assurance tool to identify one or more security threats (anomalies). Then the one or more security threat levels are ranked. For instance, a computer may generate a risk score of each of the one or more threat levels based on a risk algorithm that applies to the sentiments/behavior underlying each respective threat level. Then the computer may rank the one or more threat levels based on their risk score.

In a next step 312, a computer is configured to display a ranked list of the one or more threat levels on a graphical user interface of an analyst computer. In some embodiments, a computer is configured to display a list of alerts on a graphical user interface of an analyst computer, where an alert is generated for each threat level. For instance, the computer may generate and transmit the alert corresponding to each threat level to an analyst computer associated with a set of analyst credentials with rights to access a sub-database containing the alert. The analyst computer is configured to evaluate the alert and correct the one or more anomalies.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    parsing, by a computer, one or more source code files containing machine-readable source code into one or more code structures;
    applying, by the computer, one or more machine-learning models on the source code structures and one or more metadata files associated with the source code files;
    generating, by the computer, one or more risk scores corresponding to one or more anomalies of the one or more source code structures based upon applying the one or more machine-learning models;
    for each respective anomaly determining, by the computer, a category for the anomaly based upon the risk score generated for the anomaly, the category determined for the anomaly associated with an annotation for marking the anomaly in at least one source code file; and
    generating, by the computer, a display indicating each anomaly and the category determined for the anomaly.

2. The method according to claim 1, wherein the one or more metadata files include one or more log files containing timestamps for check-ins and check-outs of the one or more source code files in a source code repository, and wherein applying at least one machine-learning model comprises:
    analyzing, by the computer, the timestamps for the check-ins and the check-outs of the one or more source code files indicated by the one or more log files.

3. The method according to claim 1, further comprising generating, by the computer, one or more annotated source code files indicating each of the anomalies based upon applying the one or more machine-learning models.

4. The method according to claim 1, wherein the one or more machine-learning models includes at least one of sentiment analysis tool and a pattern analysis tool.

5. The method according to claim 1, further comprising identifying, by the computer, one or more sentiments or behavior patterns in the one or more source code files based upon applying the one or more machine-learning models.

6. The method according to claim 1, further comprising annotating, by the computer, a source code file using the annotation by marking a sentiment or a behavior pattern at a location in the source code file identified to have the sentiment or the behavior pattern in the category of the anomaly associated with the annotation.

7. The method according to claim 1, further comprising receiving, by the computer, the one or more source code files from a source code repository.

8. The method according to claim 1, further comprising receiving, by the computer, at least a portion of the metadata files from a database.

9. The method according to claim 8, wherein a portion of the metadata includes at least one of an embedded comment, a version control log, and a bug report.

10. The method according to claim 1, further comprising training, by the computer, the one or more machine-learning models by applying the one or more machine-learning models on a training dataset containing an earlier source code file and an earlier metadata filed.

11. A system comprising:
a computer comprising a processor configured to:
parse one or more source code files containing machine-readable source code into one or more code structures;
apply one or more machine-learning models on the source code structures and one or more metadata files associated with the source code files;
generate one or more risk scores corresponding to one or more anomalies of the one or more source code structures based upon applying the one or more machine-learning models;
for each respective anomaly determine a category for the anomaly based upon the risk score generated for the anomaly, the category determined for the anomaly associated with an annotation for marking the anomaly in at least one source code file; and
generating a display indicating each anomaly and the category determined for the anomaly.

12. The system according to claim 11, wherein the one or more metadata files include one or more log files containing timestamps for check-ins and check-outs of the one or more source code files in a source code repository; and
wherein the processor applying at least one machine-learning model is configured to analyze the timestamps for the check-ins and the check-outs of the one or more source code files indicated by the one or more log files.

13. The system according to claim 11, wherein the processor is further configured to generate one or more annotated source code files indicating each of the anomalies based upon applying the one or more machine-learning models.

14. The system according to claim 11, wherein the one or more machine-learning models includes at least one of sentiment analysis tool and a pattern analysis tool.

15. The system according to claim 11, wherein the processor is further configured to identify one or more sentiments or behavior patterns in the one or more source code files based upon applying the one or more machine-learning models.

16. The system according to claim 11, wherein the processor is further configured to annotate a source code file using the annotation by marking a sentiment or a behavior pattern at a location in the source code file identified to have the sentiment or the behavior pattern in the category of the anomaly associated with the annotation.

17. The system according to claim 11, further comprising a source code repository configured to store one or more source code files, wherein the processor is further configured to receive the one or more source code files from the source code repository.

18. The system according to claim 11, further comprising a data configured to store a portion of the metadata files, wherein the processor is further configure to receive at least the portion of the metadata files from the database.

19. The system according to claim 18, wherein a portion of the metadata includes at least one of an embedded comment, a version control log, and a bug report.

20. The system according to claim 11, wherein the processor is further configured to train the one or more machine-learning models by applying the one or more machine-learning models on a training dataset containing an earlier source code file and an earlier metadata filed.

* * * * *